US008674917B2

(12) United States Patent
Lee et al.

(10) Patent No.: US 8,674,917 B2
(45) Date of Patent: Mar. 18, 2014

(54) METHOD AND SYSTEM FOR ADJUSTING GRAY-SCALE LEVEL OF LIQUID CRYSTAL DISPLAY DEVICE

(75) Inventors: Seung-Won Lee, Seoul (KR); Jae-Ho Oh, Seoul (KR); Kwan-Young Oh, Anyang-si (KR)

(73) Assignee: Samsung Display Co., Ltd. (KR)

(*) Notice: Subject to any disclaimer, the term of this patent is extended or adjusted under 35 U.S.C. 154(b) by 2004 days.

(21) Appl. No.: 11/600,271

(22) Filed: Nov. 14, 2006

(65) Prior Publication Data

US 2007/0109241 A1 May 17, 2007

(30) Foreign Application Priority Data

Nov. 15, 2005 (KR) ........................ 10-2005-0109005

(51) Int. Cl.
*G09G 3/36* (2006.01)
*G06F 3/038* (2013.01)
*G09G 5/10* (2006.01)

(52) U.S. Cl.
USPC ............. 345/89; 345/102; 345/103; 345/204; 345/207; 345/690

(58) Field of Classification Search
USPC ........ 345/55, 84–89, 102–103, 204–207, 690
See application file for complete search history.

(56) References Cited

U.S. PATENT DOCUMENTS

| | | | | |
|---|---|---|---|---|
| 4,852,002 | A * | 7/1989 | Klausz | 382/274 |
| 2003/0001810 | A1* | 1/2003 | Yamaguchi et al. | 345/87 |
| 2004/0257324 | A1* | 12/2004 | Hsu | 345/89 |
| 2006/0214940 | A1* | 9/2006 | Kinoshita et al. | 345/589 |

FOREIGN PATENT DOCUMENTS

| | | | |
|---|---|---|---|
| CN | 1414539 | A | 4/2003 |
| CN | 1477614 | A | 2/2004 |
| JP | 2003-029724 | A | 1/2003 |
| KR | 10-2003-0003065 | A | 1/2003 |

* cited by examiner

*Primary Examiner* — Lun-Yi Lao
*Assistant Examiner* — Jarurat Suteerawongsa
(74) *Attorney, Agent, or Firm* — Innovation Counsel LLP

(57) ABSTRACT

A method and system for adjusting a gray-scale level of an LCD device. The method includes: checking a default gray-scale value A; comparing default brightness value YA with a target brightness value YX; inputting a trial gray-scale value B; and outputting a target gray-scale value X. The method employs a preselected Similarity of Triangles technique. The system employs a image-capturing unit determining screen brightness and a control unit using a preselected Similarity of Triangles technique to adjust the gray-scale level of a connected display device, reducing a single-screen-capture gray-scale level adjustment interval to about 1.8 to 2.1 seconds.

18 Claims, 6 Drawing Sheets

METHOD AND SYSTEM FOR ADJUSTING GRAY-SCALE LEVEL OF LIQUID CRYSTAL DISPLAY DEVICE

CROSS-REFERENCE TO RELATED APPLICATION

This application claims priority to and the benefit of Korean Patent Application No. 10-2005-0109005 filed in the Korean Intellectual Property Office on Nov. 15, 2005, the entire contents of which are incorporated herein by reference.

BACKGROUND OF THE INVENTION (a) Field of the Invention

The present invention relates to a method and system for adjusting a gray-scale level of a liquid crystal display device.

(b) Description of the Related Art

In general, liquid crystal displays (LCDs) include two display panels, each having pixel electrodes and a common electrode formed thereon, and a liquid crystal layer having anisotropic dielectric interposed between the two display panels. The pixel electrodes are arranged in a matrix, and are connected to switching elements, such as thin film transistors (TFTs). The common electrode is formed on the entire surface of the corresponding display panel, and a common voltage is applied to the common electrode. The pixel electrode, the common electrode, and the liquid crystal layer interposed therebetween form a liquid crystal capacitor in a circuit structure. The liquid crystal capacitor and the switching element connected thereto constitute a unit pixel. A data voltage is applied sequentially to rows of the pixel electrodes.

In the liquid crystal display, a voltage is applied to the two electrodes to generate an electric field in the liquid crystal layer. The electric field intensity is adjusted to control the light transmitted through the liquid crystal layer, thereby obtaining a desired image. The polarity of a data voltage with respect to the common voltage is inverted for every frame, every column, or every pixel, when it is desired to prevent deterioration that may result from a prolonged application of the electrical field to the liquid crystal layer.

Typically, a display device such as a liquid crystal display or an organic light emitting display device, include a display panel constituted of pixels having switching elements and display signal lines; a gate driver configured to supply gate signals to gate lines that operate (turn on/off) the pixel switching elements; a gray-scale level voltage generator configured to generate a plurality of gray-scale level voltages; a data driver configured to select a data voltage corresponding to image data among the gray-scale level voltages, and to apply the data voltage to the data lines of the display signal lines; and a signal controller configured to control the gate driver, the data driver, and the gray-scale level voltage generator.

In general, am image characteristic of the above-described liquid crystal display device, such as image quality or brightness of a screen, may vary in accordance with a gamma curve, in which the relationship between a gray-scale level and brightness is determined. When a default value that is initially set to provide a desired brightness value (hereinafter, referred to as 'target brightness value'), it generally is not necessary to set the default value again. However, in many cases, it is difficult to maintain the desired target brightness value. Therefore, a gray-scale value corresponding to the desired target brightness value may need to be set again. However, if it takes a long time to set the target brightness value, the productivity of the display user can be reduced. Thus, it is desirable to adjust gray-scale level values in a display device quickly.

SUMMARY OF THE INVENTION

A method and system are provided for adjusting a gray-scale level of a liquid crystal display device that minimizes a gray-scale level adjustment interval. According to an embodiment of the present invention, a method of adjusting a gray-scale level of a liquid crystal display device includes: checking a default gray-scale level value A; comparing a brightness value YA corresponding to the default gray-scale level value A with a target brightness value YX; inputting a trial gray-scale level value B; and outputting a target gray-scale level value X. The trial gray-scale level value B may be one of less than each of the default gray-scale level value A and the target gray-scale level value X, or greater than each of the default gray-scale level value A and the target gray-scale level value X.

Further, the target gray-scale level value X may be determined by using a predetermined Similarity of Triangles technique. In selected embodiments, the target gray-scale level value X is determined using a predetermined Similarity of Triangles technique in accordance with the equation:

$$X=B+(YX-YB)*(A-B)/(YA-YB).$$

The trial gray-scale level value B may be provided between the default gray-scale level value A and the target gray-scale level value B, and the target value X also may be determined by using a predetermined Similarity of Triangles technique, in which the target gray-scale level value X is determined in accordance with the equation:

$$X=B+(YX-YB)*(A-B)/(YA-YB).$$

According to another exemplary embodiment of the present invention, a system for adjusting a gray-scale level of a liquid crystal display device includes: a liquid crystal display device having a gray-scale level voltage generator; an image capturing unit configured to capture a screen of the liquid crystal display device; a control unit connected to the image capturing unit and configured to receive a brightness value therefrom; and a display pattern generator that is connected to the control unit and the display device and that is configured to generate display patterns on the basis of a control signal output from the control unit and to input the display patterns to the liquid crystal display device. The control unit further is configured to compares a brightness value YA corresponding to a default gray-scale level value with a target brightness value YX, to input a trial gray-scale level value B on the basis of the comparison result, and to outputs a target gray-scale level value X.

In embodiments of the system, a trial gray-scale level value B may be one of less than each of the default gray-scale level value A and the target gray-scale level value X, or greater than each of the default gray-scale level value A and the target gray-scale level value X. The target gray-scale level value X may be determined by using a predetermined Similarity of Triangles technique. Further, the target gray-scale level value X can be determined in accordance with the equation: X=B+(YX−YB)*(A−B)/(YA−YB). Also, the trial gray-scale level value B may exist between the default gray-scale level value and the target gray-scale level value X. The target gray-scale level value X may be determined by using a predetermined Similarity of Triangle technique, in which the target gray-scale level value X is determined in accordance with the equation:

$$X=B+(YX-YB)*(A-B)/(YA-YB).$$

The image-capturing unit may have at least one image-capturing device, and the display pattern generator may generate at least one pattern and then transmit the generated pattern to the liquid crystal display device. Also, the image capturing unit may have at least six image capturing devices, and the display pattern generator may be configured to generate at least six patterns to transmit to the liquid crystal display device.

BRIEF DESCRIPTION OF THE DRAWINGS

The accompanying drawings briefly described below illustrate exemplary embodiments of the present invention, and together with the description, serve to explain the principles of the present invention, in which.

DETAILED DESCRIPTION OF THE EMBODIMENTS

Figure 1:
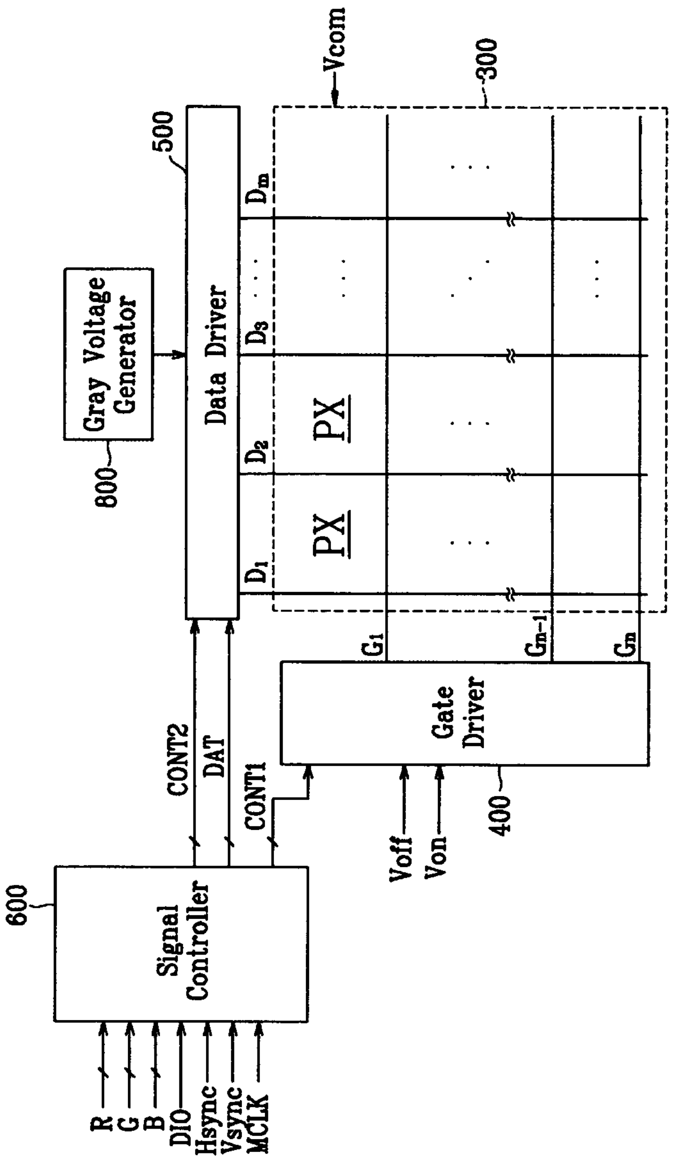
FIG. 1 is a block diagram showing a liquid crystal display device according to an exemplary embodiment of the present invention.

The present invention will be described more fully hereinafter with reference to the accompanying drawings, in which preferred embodiments of the invention are shown.

In the drawings, the thickness of layers, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
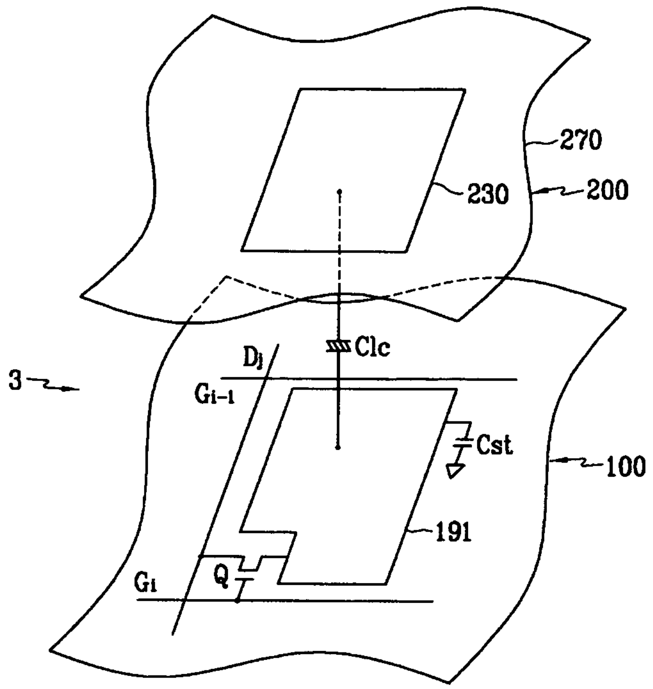
FIG. 2 is an equivalent circuit diagram of a pixel of the liquid crystal display device according to the exemplary embodiment of the present invention.

A liquid crystal display device according to an exemplary embodiment of the present invention is described with reference to FIGS. 1 and 2. FIG. 1 is a block diagram illustrating a liquid crystal display device according to the exemplary embodiment of the present invention. FIG. 2 is an equivalent circuit diagram of a pixel of the liquid crystal display device in FIG. 1.

In FIG. 1, an exemplary liquid crystal display includes a liquid crystal panel assembly 300, a gate driver 400, a data driver 500, a signal controller 600 that controls the gate driver 400 and the data driver 500, and a gray voltage generator 800 connected to the data driver 500. The gate driver 400 and the data driver 500 are connected to the liquid crystal panel assembly 300.

In the equivalent circuit diagram of FIG. 2, the liquid crystal panel assembly 300 is connected to a plurality of signal lines G1 to Gn and D1 to Dm, and includes a plurality of pixels PX arranged substantially in a matrix. The liquid crystal panel assembly 300 includes a lower panel 100, an upper panel 200 opposite to the lower panel 100, and a liquid crystal layer 3 interposed therebetween. The signal lines include a plurality of gate lines G1 to Gn and a plurality of data lines D1 to Dm. The plurality of gate lines G1 to Gn are configured to transmit gate signals (referred to as "scanning signals"), whereas the plurality of data lines D1 to Dn are configured to transmit data signals. The gate lines G1 to Gn extend substantially in parallel in a row direction, and the data lines D1 to Dm extend substantially in parallel in a column direction. Exemplary pixel PX connected to an i-th (i=1, 2, . . . , n) gate line Gi and a j-th (j=1, 2, . . . , m) data line Dj can include a switching element Q, which is connected to the signal lines Gi and Dj; a liquid crystal capacitor Clc, which is connected to the switching element Q; and a storage capacitor Cst, which can be optional.

The switching element Q is a three-terminal element, such as a thin film transistor, provided on the lower panel 100. A control terminal of the switching element Q is connected to the gate line Gi, an input terminal thereof is connected to the data line Dj, and an output terminal thereof is connected to the liquid crystal capacitor Clc and, if included, the storage capacitor Cst.

The liquid crystal capacitor Clc has as two terminals respectively connected to a pixel electrode 191 of the lower panel 100, and a common electrode 270 of the upper panel 200. The liquid crystal layer 3 can be the dielectric disposed between the two electrodes 191 and 270. The pixel electrode 191 is connected to the switching element Q. The common electrode 270 is formed on the entire surface of the upper panel 200, and is supplied with a common voltage Vcom. In an alternative embodiment to the structure shown in FIG. 2, the common electrode 270 may be provided on the lower panel 100, in which case, at least one of the two electrodes 191 and 270 may be formed in a linear or bar shape.

The storage capacitor Cst, serves as an auxiliary member of the liquid crystal capacitor Clc, and is composed of a signal line (not shown) provided on the lower panel 100, the pixel electrode 191, and an insulator interposed therebetween. A predetermined voltage, such as a common voltage Vcom, is applied to the signal line. Alternatively, the storage capacitor Cst may be a laminated structure of the pixel electrode 191, the insulator, and a gate line previously formed on the insulator.

To provide a color display, each pixel PX may display a specific primary color (spatial division), thereby causing spatial synthesis of a desired color. In addition, the pixels PX may display the primary colors alternately, with time (temporal division), thereby causing temporally synthesis of a desired color. The primary colors may include, for example, red, green, and blue. As an example of the spatial division, FIG. 2 shows that each pixel PX has a color filter 230 for displaying one of the primary colors in a region of the upper panel 200 corresponding to the pixel electrode 191. In an alternative to the structure shown in FIG. 2, the color filter 230 may be provided above or below the pixel electrode 191 of the lower panel 100. At least one polarizer (not shown) for polarizing light is mounted on an outer surface of the display crystal panel assembly 300.

Referring back to FIG. 1, the gray-scale level voltage generator 800 generates two gray voltage groups (or reference gray voltage groups) related to the transmittance of the pixel PX. One of the (reference) gray voltage groups has a positive value with respect to the common voltage Vcom, and the other gray voltage group has a negative value with respect to the common voltage Vcom. The gate driver 400 is connected to the gate lines G1 to Gn of the liquid crystal panel assembly 300, and supplies gate signals, each composed of a combination of a gate-on voltage Von and a gate-off voltage Voff, to the gate lines G1 to Gn. The data driver 500 is connected to the data line D1 to Dm of the liquid crystal panel assembly 300, selects a gray voltage generated by the gray voltage generator 800, and supplies the selected gray voltage to the data lines D1 to Dm as a data signal. However, in embodiments where the gray-scale level voltage generator 800 does not supply all the gray-scale level voltages, but supplies only a predetermined number of reference gray-scale level voltages, the data driver 500 divides the reference voltages to generate additional gray-scale level voltages corresponding all of the gray-scale levels, and selects the data signal from the generated gray-scale level voltages. The signal controller 600 controls, for example, the gate driver 400 and the data driver 500.

Each of the drivers 400, 500, 600, and 800 may be directly mounted on the liquid crystal panel assembly 300 in the form of at least one IC chip. The IC chip may be mounted on a flexible printed circuit film (not shown) and then mounted on the liquid crystal panel assembly 300 in the form of a TCP (tape carrier package). In another example, the IC chip may be mounted on a separate printed circuit board (PCB) (not shown). Alternatively, the drivers 400, 500, 600, and 800 may be integrated into the liquid crystal panel assembly 300 together with, for example, the signal lines G1 to Gn and D1 to Dm and thin film transistor switching elements Q. In addition, the drivers 400, 500, 600, and 800 may be integrated into a single chip. In this case, at least one of the drivers or at least one circuit forming the drivers may be arranged outside the single chip. Hereinafter, the operation of the above-described liquid crystal display device will be described in detail.

The signal controller 600 receives input image signals R, G, and B, and input control signals for controlling display of the input image signals from a graphics controller (not shown). An exemplary input control signal may include at least one of a vertical synchronization signal Vsync; a horizontal synchronization signal Hsync; a main clock signal MCLK; or and a data enable signal DE. The signal controller 600 is configured to process the input image signals R, G, and B, rendering them as output signals (DAT) suitable for the operational conditions of the liquid crystal panel assembly 300 on the basis of the input image signals R, G, and B and the input control signals. In addition, the signal controller 600 is configured to generate output signals, for example, a gate control signal CONT1 and a data control signal CONT2, which are transmitted to the gate driver 400 and the data driver 500. For example, the signal controller 600 transmits the gate control signal CONT1 to the gate driver 400, and transmits the data control signal CONT2 and the processed image signal DAT to the data driver 500. The gate control signal CONT1 includes a scanning start signal STV for indicating the start of scanning, and at least one clock signal for controlling the output cycle of the gate-on voltage Von. The gate control signal CONT1 further may include an output enable signal OE that defines the duration of the gate-on voltage Von. The data control signal CONT2 includes a horizontal synchronization start signal STH for indicating that the transmission of data to a row of pixels PX starts, a load signal LOAD for allowing data signals to be transmitted to the data lines D1 to Dm, and a data clock signal HCLK. The data control signal CONT2 may further include an inversion signal RVS for inverting the polarity of a data signal voltage with respect to the common voltage Vcom. For simplicity, the term "polarity of a data signal voltage with the common voltage" is hereinafter "the polarity of a data signal."

The data driver 500 receives the digital image signal DAT for a row of pixels PX in response to the data control signal CONT2, selects a gray voltage corresponding to each digital image signal DAT, converts the digital image signal DAT into an analog data signal, and supplies the analog data signal to the corresponding data lines D1 to Dm. The gate driver 400 applies the gate-on voltage Von to the gate lines G1 to Gn on the basis of the gate control signal CONT1 from the signal controller 600 to turn on the switching elements Q connected to the gate lines G1 to Gn. Then, the data signals applied to the data lines D1 to Dm are supplied to the corresponding pixels PX through the switching elements Q that are in an on state.

A difference between the voltage of the data signal applied to the pixel PX and the common voltage Vcom is a charging voltage of the liquid crystal capacitor Clc, that is, a pixel voltage. The alignment directions of liquid crystal molecules depend on the level of the pixel voltage, which causes the polarization of light that passes through the liquid crystal layer 3 to vary. The variation in polarization causes a variation in the transmittance of light by the polarizer mounted on the liquid crystal panel assembly 300. Theses processes are repeatedly performed for every one horizontal period (which is referred to as "1H" and generally is equal to one period of the horizontal synchronization signal Hsync and the data enable signal DE). In this way, the gate-on voltage Von is sequentially applied to all the gate lines G1 to Gn, and the data signals are supplied to all the pixels PX, thereby displaying one frame of images.

When one frame has ended, the next frame starts. In this case, the state of the inversion signal RVS applied to the data driver 500 is controlled such that the polarity of the data signal applied to each pixel PX is opposite to the polarity of the data signal in the previous frame ("frame inversion"). The polarity of the data signal applied to one data line may be inverted in the same frame according to the characteristic of the inversion signal RVS (for example, row inversion and dot inversion), and the polarities of the data signals applied to a row of pixels may be different from each other (for example, column inversion and dot inversion).

Figure 3:
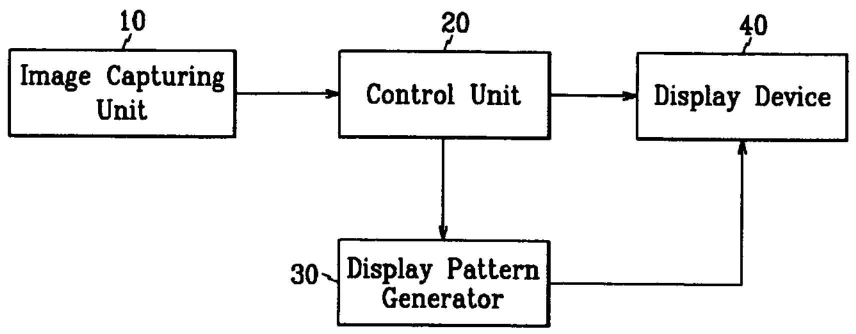
FIG. 3 is a block diagram showing a gray-scale level adjustment system for the liquid crystal display device according to an exemplary embodiment of the present invention.
Figure 4:
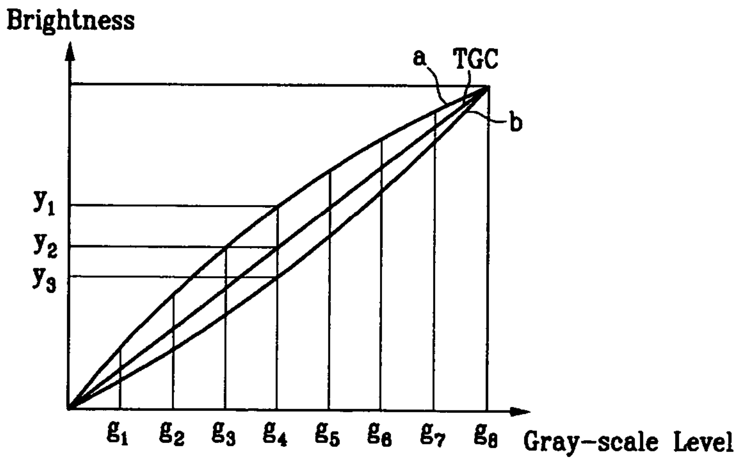
FIG. 4 graphically depicts an exemplary gamma curve illustrating a gray scale adjustment method according to an exemplary embodiment of the present invention.

In the context of the foregoing, exemplary embodiments of a gray-scale level adjustment method and system according to the present invention are be described with reference to FIGS. 3 through 8. FIG. 3 is a block diagram illustrating an exemplary embodiment of a system for adjusting a gray-scale level for a liquid crystal display device, in accordance with the present invention. FIG. 4 graphically depicts an exemplary gamma curve illustrating embodiments of the method for adjusting a gray-scale level for a liquid crystal display device, in accordance with the present invention.

In FIG. 3, the exemplary system for adjusting a gray-scale level for a liquid crystal display device includes an image-capturing unit 10, a control unit 20, a display pattern generator 30, and a display device 40. The image-capturing unit 10 captures a screen of the display device 40 to obtain brightness information in the form of a brightness value. The control unit 20 receives the brightness information from the image-capturing unit 10 and, on the basis of the brightness information, control unit 20 sets a gray-scale level value suitable for the display device 40. The display pattern generator 30 generates a display patterns to capture images on the basis of the control signals from the control unit 20, and displays the display patterns on the display device 40.

As described above, the gray voltage generator 800 generates a predetermined number of reference gray voltages. Then, the data driver 500 divides the reference gray voltages so as to generate a desired gray voltage. Therefore, gray-scale levels shown in the horizontal axis of FIG. 4 indicate reference gray-scale levels. A gamma curve can be adjusted by adjusting the reference gray-scale levels, such that all gray-scale levels may be adjusted. In an exemplary embodiment in which an image signal has 8 bits, the number of gray-scale levels becomes 256. Further, it may be desirable to adjust as reference gray-scale levels, a preselected number of gray-scale levels, for example, between about six to about nine gray-scale levels, among the 256 gray-scale levels of the 8-bit image signal. In selected embodiments, the black gray-scale level, which is the lowest reference gray-scale level, and the white gray-scale level, which is the highest reference gray-scale level, are not adjusted. Instead, reference gray-scale levels between the black gray scale and the white gray scale are adjusted. Advantageously, an exemplary method of adjusting the gray-scale levels of a liquid crystal display device, can provide for adjustment of plural reference gray-scale level voltages, for example, six to seven reference gray-scale level voltages, such as the six gray-scale levels, g2 to g7 or seven gray-scale levels, g2 to g8, illustrated on the horizontal axis of FIG. 4.

In general, when a previously-input default gray-scale level value appears in the liquid crystal display device in a form represented by line “a” or line “b” in the exemplary gamma curve of FIG. 4, it is desirable to reset a gray-scale level in accordance with a target gamma curve (TGC), thereby obtaining a corresponding target brightness value. For example, although a nominal brightness of “y2” may correspond to a default gray-scale level value “g4”, the brightness displayed according to gamma curve line “a” is “y1”, a greater brightness, whereas the brightness displayed according to gamma curve line “b” is “y3”, a lesser brightness. However, a current liquid crystal device may operate under the assumption that the brightness corresponding to gray-scale level input “g4” remains at brightness level “y2”. In such a case, it is desirable to determine and provide, or set, brightness level value that corresponds to the gray-scale level g4.

Figure 5:
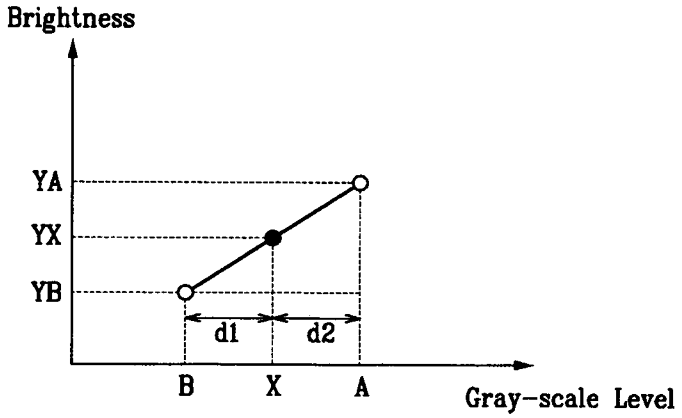
FIG. 5 to 7 graphically illustrates a method of adjusting the gray-scale level using brightness levels and gray-scale levels, in accordance with the present invention.
Figure 6:
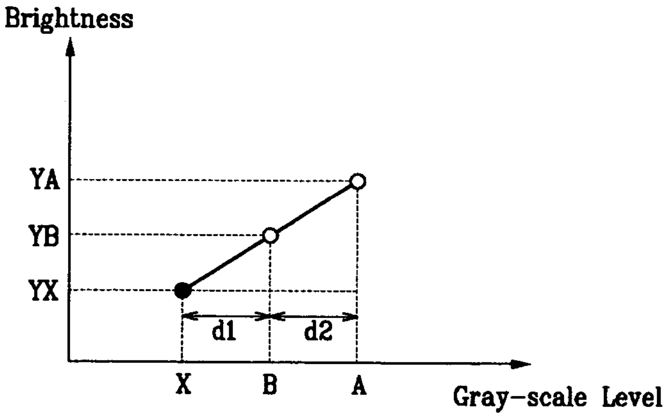
Figure 7:
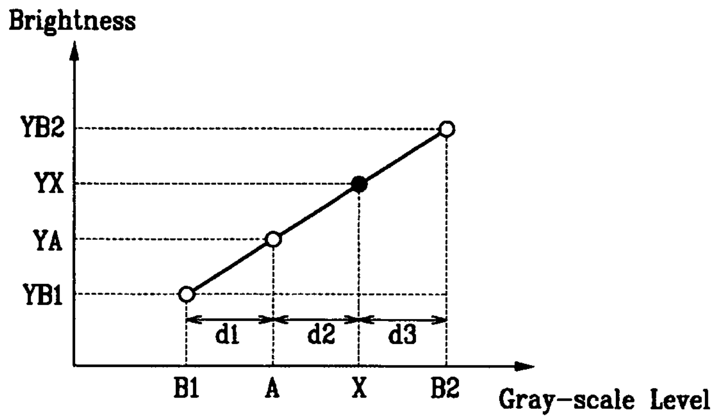
Figure 8:
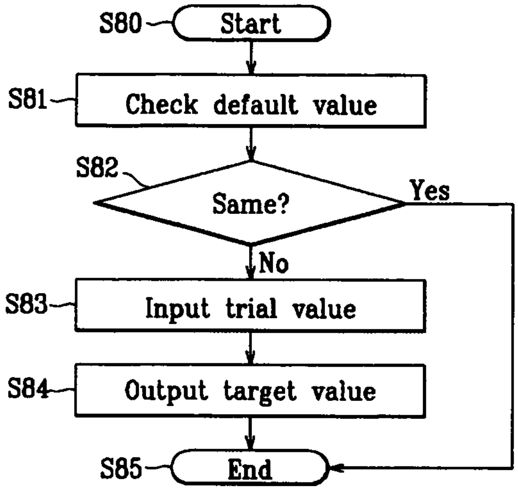
FIG. 8 is a flowchart illustrating a method of adjusting the gray-scale level according to another exemplary embodiment of the present invention.

FIGS. 5 to 7 graphically illustrate exemplary method embodiments of adjusting the gray-scale level for a liquid crystal display device, in accordance with the present invention. Also, FIG. 8 is a flowchart depicting a method of adjusting the gray-scale level according to another exemplary embodiment of the present invention.

In graphs of FIGS. 5 to 7, the horizontal axis indicates the gray scale level. “A” indicates a predetermined gray-scale level in the liquid crystal device, that is, a default value, “X,” indicates a target gray-scale level value, and “B” (as well as B in the form of “Bn”) indicates a trial gray-scale level value. The vertical axis indicates a brightness value of a corresponding gray-scale level value. Desirably, a predetermined Similarity Of Triangles technique can be used to determine the target gray-scale by which a side of a triangle is determinable when two sides of two triangles correspond with identical ratios, and the length of these sides are known values. A predetermined Similarity Of Triangles technique can be used, even though the size of the first triangle is different from the size of the second triangle. A preselected Similarity of Triangles technique can include a preselected Congruence of Triangles technique in which all three angles and the length of all three sides of each triangle are congruent (equal). Thus, a predetermined Similarity Of Triangles technique in accordance with the present invention allows the target gray-scale level value X to be obtained by determining the proportional relationships formed by the aforementioned known values, and by identifying the gray-scale level corresponding to target brightness value YX.

In the exemplary illustration of FIG. 5, a brightness value corresponding to the default gray-scale level value A is identified by “YA”. A brightness value corresponding to a trial gray-scale level value B is identified by “YB.” Also, a brightness value corresponding to a target gray-scale level value X is identified by “YX”. In general, to find a gray-scale value X corresponding to the target brightness value YX, a trial gray-scale level value B is input, thereby obtaining a corresponding brightness value YB. Because each of the brightness values YA, YX, and YB, the default gray-scale level value A, and the trial gray-scale level value B are known, the target gray-scale level value X can be obtained according to using a predetermined Similarity of Triangles technique. In FIG. 5, value “d1” indicates a first difference magnitude between a trial gray-scale value level B and the target gray-scale level value X, and value “d2” indicates a second difference magnitude between a default gray-scale value level A and the target gray-scale level value X.

Accordingly, $$(YA - YX):(YA - YB) = d2:d1 + d2 \qquad (1)$$
$$= (A - X):(A - B)$$

Also, Equation 2 can be obtained by arranging Equation 1 on the basis of X:

$$X=B+(YX-YB)*(A-B)/(YA-YB) \qquad (2)$$

Likewise, in the case of the exemplary embodiment shown in FIG. 6, value “d1” indicates a first difference magnitude between a trial gray-scale value level B and the target gray-scale level value X, and value “d2” indicates a second difference magnitude between a default gray-scale value level A and the trial gray-scale value level B. Using a Similarity of Triangles, a proportional relationship can be obtained readily, as with Equation 1:

$$A - YB:YB - YX = d2:d1 \qquad (3)$$
$$= (A - B):(B - X)$$

As with Equations 1 and 2, when Equation 3 is rearranged on the basis of X, the following Equation 4 is obtained:

$$X=B+(YX-YB)(A-B)/(YA-YB). \qquad (4)$$

The result of Equation 4 substantially identical to that of Equation 2. That is, where the magnitude of the target brightness value YX is less than the magnitude of the default brightness value YA, the result is substantially independent of the magnitude of trial gray-scale level value B, such that the target gray-scale level value X can be obtained using Equation 2.

In addition to the examples illustrated in FIGS. 5 and 6, where target level X was less than default value A, FIG. 7 illustrates that the target gray-scale level value X also can be obtained when the magnitude of the default gray-scale level value A is less than the magnitude of the target gray-scale level value X.

The trial value can be set to a first gray-scale level value "B1," which is generally less than the default gray-scale level value A, with the corresponding difference magnitude being represented by "d1." or, alternatively, the trial value can be set to a second trial gray-scale level value "B2," which is shown to be generally greater than the default gray-scale level value A, and which also may be generally greater than the target gray-scale level value X. In FIG. 7, the gray-scale level difference magnitude between the default gray-scale level value A and the target gray-scale level value X is illustrated by "d2," and the gray-scale level difference magnitude between the default gray-scale level value A and the target gray-scale level value X is illustrated by "d3."

As before, using a predetermined Similarity of Triangles technique, the target gray-scale level value X may be determined substantially independently of whether the magnitude of the default gray-scale level value A is greater than, equal to, or less than the target gray-scale level value X; and may be determined substantially independently of whether the magnitude of the trial gray-scale level value B is greater than, equal to, or less than the target gray-scale level value X. Conveniently, one or more trial gray-scale level value, such as first trial gray-scale level value B1 and first trial gray-scale level value B2, can be set to exist between the default gray-scale level value A and the target gray-scale level value X, with the gray-scale level value X being determinable using a predetermined Similarity of Triangles technique, for example, according to Equation 2.

An embodiment of a method of determining the target gray-scale value X, according to the present invention, can be described with reference to FIG. 8, and also within the context of FIG. 3.

The method of FIG. 8 can commence by checking a brightness value YA corresponding to default gray-scale level value A (S81). Conveniently, checking (S81) may be accomplished by the image-capturing unit 10, shown in FIG. 3, which is configured to capture a screen of a display device (e.g., device 40), to determine the brightness value YA corresponding to the default gray-scale level value A, and to transmit the determined brightness information on the screen for additional analysis, for example, to the control unit 20.

Then, exemplary control unit 20 can determines whether a brightness value YA, corresponding to the default gray-scale level value A is substantially the same as the target brightness value YX (S82). If the default brightness value YA is substantially the same as the target brightness value YX, then the gray scale adjustment operation is completed (S85). Otherwise, a trial gray-scale level value B, which may be one of greater than or less than the default gray-scale level value A is input (S83) to pattern generator 30 and thus to display 40, to which the display device 40 responds. In turn, the image capturing unit 10 can determine a brightness value YB, corresponding to trial gray-scale level value, B, and can transmit the brightness value YB to the control unit 20, that determines the target gray-scale level value X using a predetermined Similarity of Triangles technique and that outputs target gray-scale level value X (S84).

In exemplary embodiments, it takes about 0.1 seconds, respectively, to input and measure a brightness value YA corresponding to the default gray-scale level value A; to obtain a brightness value YB corresponding to a trial gray-scale level value B; and to output a brightness value YX corresponding to a target gray-scale level value X. Accordingly, using a predetermined Similarity of Triangles technique in accordance with the present embodiments, a gray-scale adjustment with respect to plural reference gray-scale levels, for example, six or seven levels, may be performed within a gray-scale adjustment interval of between about 1.8 seconds to about 2.1 seconds. This increased performance may produce improved productivity for a display user.

In addition, although exemplary embodiments herein, describe an image capturing unit, such as unit 10 in FIG. 3, configured to capture a single pattern, the embodiments of the present invention are no so limited. Instead, a plurality of image capturing devices may be employed by an image-capturing unit, such as unit 10 in FIG. 3, and the corresponding gray-scale level adjustment interval can be reduced additionally using such an image-capturing unit. In such alternative embodiments, a screen of exemplary device 40 can be divided into a plurality of sub-screens, with a plurality of reference gray-scale levels being respectively input on the divided sub-screens, and by causing the plurality of image capturing devices to capture the sub-screens, for example, at one time. Accordingly, although in certain embodiments according to the present invention, can reduce a gray-scale level adjustment interval to between about 1.8 seconds to about 2.1 seconds using a single image capturing device, the gray-scale adjustment interval may be reduced further in alternative embodiments in which a plurality of image capturing devices are employed. In certain alternative embodiments, an image-capturing unit, such as unit 10 in FIG. 3, may include at least six image-capturing devices. In such embodiments, it may be desirable for the display pattern generator, such as generator 30 in FIG. 3, to generate at least six patterns to be transmitted to the liquid crystal display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of adjusting a produced gray-scale voltage level of a liquid crystal display device so as to achieve a desired, target brightness having a value $Y_X$ to be output by the device in correspondence with a predetermined input gray-scale value signal, the method comprising:

first using a current default gray-scale voltage level value A of the device so as to cause the device to output a corresponding, default brightness, which default brightness is captured as a default brightness value, $Y_A$;

next applying to the device a trial gray-scale voltage level value B that is different from A and capturing the responsive brightness value $Y_B$ of the device; and based on the current default and trial gray-scale voltage level values, A and B, and based on the respectively captured brightness values, $Y_A$ and $Y_B$ as well as the target brightness value $Y_X$ determining a corresponding target gray-scale voltage level value X, and adjusting the gray-scale voltage level produced by the device in response to the corresponding input gray-scale value signal to be X instead of A.

2. The method of adjusting a gray-scale voltage level of a liquid crystal display device according to claim 1, wherein the trial gray-scale voltage value B is less than the default gray-scale voltage value A.

3. The method of claim 2, wherein the target gray-scale voltage value X is determined by using a predetermined Similarity of Triangles technique.

4. The method of claim 3, wherein the target gray-scale voltage value X is determined in accordance with the equation:

$$X=B+(YX-YB)(A-B)/(YA-YB).$$

5. The method of Claim 1, wherein the trial gray-scale voltage value B is chosen to be between the default gray-scale voltage value A and the target gray-scale voltage value X.

6. The method of claim 5, wherein the target gray-scale voltage value X is determined using a predetermined Similarity of Triangles technique.

7. The method of claim 6, wherein the target gray-scale voltage value X is determined in accordance with the equation:

$$X=B+(YX-YB)(A-B)/(YA-YB).$$

8. A system for adjusting a produced gray-scale voltage level of a liquid crystal display device that is produced to correspond with a predetermined input gray-scale value signal, said system comprising:

a liquid crystal display device having a gray-scale level voltage generator;

an image-capturing unit configured to capture brightness levels output by a screen of the liquid crystal display device and to responsively output corresponding brightness value signals whose values represent brightness levels captured from the screen;

a control unit connected to the image capturing unit and configured to receive the brightness value signals from the image capturing unit and to produce a control signal output; and a display pattern generator connected to the control unit and to the liquid crystal display device, and configured to generate display patterns responsive to the control signal output from the control unit, and to input the display patterns to the liquid crystal display device, wherein the control unit is configured to first drive the liquid crystal display device using a default gray-scale voltage level value A of the voltage generator and to obtain from the image-capturing unit, a first signal representing a first brightness value $Y_A$ corresponding to the default gray-scale voltage level value A; to subsequently drive the liquid crystal display device using a trial gray-scale voltage level value B different from A and to obtain from the image-capturing unit, a second signal representing a second brightness value $Y_B$ corresponding to the trial gray-scale voltage level value B; and to use a target brightness level, value $Y_X$ in combination with first and second brightness values, $Y_A$ and $Y_B$ and in combination with the respective default and trial gray-scale voltage levels to determine a target gray-scale voltage level value X and to adjust the gray-scale level voltage generator to output the target gray-scale voltage level value X in correspondence with the predetermined input gray-scale value signal.

9. The system of claim 8, wherein the trial gray-scale voltage value B is less than the default gray-scale voltage value A.

10. The system of claim 9, wherein the target gray-scale voltage level value X is determined by using a predetermined Similarity of Triangles technique.

11. The system of claim 10, wherein the target gray-scale voltage level value X is determined in accordance with the equation:

$$X=B+(YX-YB)(A-B)/(YA-YB).$$

12. The system of claim 8, wherein the trial gray-scale voltage value B is chosen to be between the default gray-scale voltage value A and the target gray-scale voltage value X.

13. The system of claim 12, wherein the target gray-scale voltage level value X is determined in accordance with a predetermined Similarity of Triangles technique.

14. The system of claim 13, wherein the target gray-scale voltage level value X is determined in accordance with the equation:

$$X=B+(YX-YB)(A-B)/(YA-YB$$

15. The system of claim 8, wherein the image-capturing unit comprises at least one image capturing device.

16. The system of claim 15, wherein the display pattern generator is configured to generate at least one pattern and to transmit the at least one pattern to the liquid crystal display device.

17. The system of claim 8, wherein the image-capturing unit comprises at least six image-capturing devices.

18. The system of claim 17, wherein the display pattern generator is configured to generate at least six patterns to transmit to the liquid crystal display device.

* * * * *